(No Model.)

W. F. McNAMIRE.
POTATO DIGGER.

No. 526,868.  Patented Oct. 2, 1894.

INVENTOR
Willard F. McNamire.

WITNESSES:
Chas. M. Marvin.
H. A. Carhart

BY
Smith & Denison
ATTORNEYS.

UNITED STATES PATENT OFFICE.

WILLARD F. McNAMIRE, OF BOLIVAR, NEW YORK.

POTATO-DIGGER.

SPECIFICATION forming part of Letters Patent No. 526,868, dated October 2, 1894.

Application filed February 15, 1892. Serial No. 421,552. (No model.)

*To all whom it may concern:*

Be it known that I, WILLARD F. McNAMIRE, of Bolivar, in the county of Allegany, in the State of New York, have invented new and useful Improvements in Potato-Diggers, of which the following, taken in connection with the accompanying drawings, is a full, clear, and exact description.

My invention relates to potato diggers.

My object is to construct a potato digger which shall accomplish the work in hand quickly, thoroughly, and leave the crop in good condition without bruising—cheap and durable in construction and of great utility. Furthermore the object of the invention is to provide a novel combination consisting of revoluble cylindrical receptacle and a concave plow or scoop suitably operated whereby an improved implement of the class may be produced, and in the several other novel features of construction and operation hereinafter described and which are specifically set forth in the claim hereunto annexed.

It is constructed as follows, reference being had to the accompanying drawings, in which—

Figure 1:
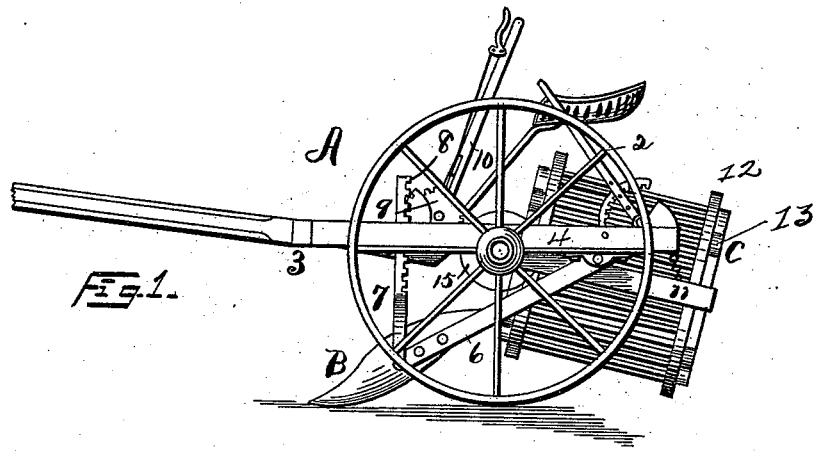
Figure 2:
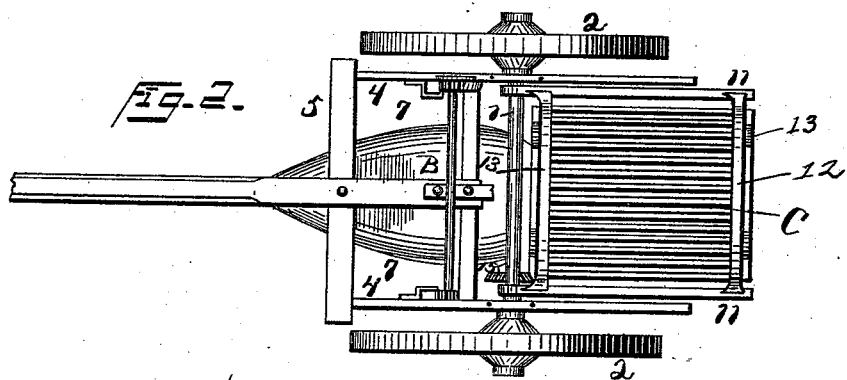
Figure 4:
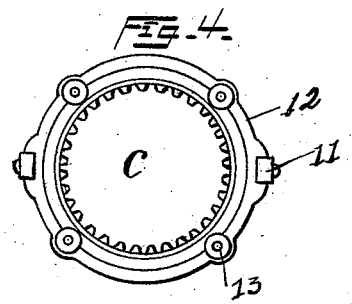
Figure 3:
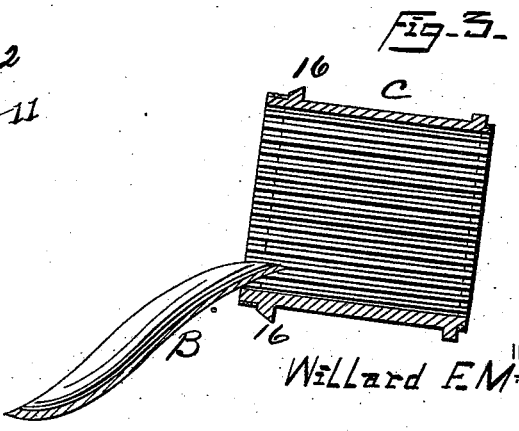

Figure 1, is a side elevation of the digger, complete. Fig. 2, is a top plan view thereof with the seat and mechanism for raising the plow, removed. Fig. 3, is a horizontal vertical section of the scoop and receiving cylinder, detached. Fig. 4, is a rear end view of the rotating cylinder.

A—, is an ordinary heavy two-wheeled sulky, comprising an axle —1—, wheels —2—, a pole —3— or other means of propelling the sulky, and adapted to operate in any ordinary well known way.

Upon the axle, I mount the frame bars —4— connected at their forward ends by the cross bar —5—. To the frame bars —4— I hinge a forwardly and downwardly extending arm or arms —6—, to the lower end of which the plow or scoop —B— is connected, having its forward end extending downwardly, and its rear end adapted to extend into the rotating cylinder —C—, hereinafter more fully set forth.

7—, is a substantially vertical rack bar, connected at its lower end to the scoop or bar —6—, and provided with the rack teeth —8—, adapted to engage with a quadrant gear —9— mounted upon the frame; and —10— is a ratchet lever secured to this gear wheel and adapted to rotate it for the purpose of raising and lowering the forward end of the scoop. Upon the rear sulky axle I also mount frame bars —11—, between which are mounted the circular trackways —12— in which I mount the cylinder —C—, in engagement with the friction rollers —13— upon said trackways. The cylinder —C— is composed of slats as shown.

Upon the rear of the frame bars —4— I provide the ordinary ratchet lever and quadrant mechanism and chain shown, for raising the rear end of the cylinder carrying frame, in which the sulky is mounted so that I can readily allow the potatoes to pass through the cylinder rapidly or slowly, by varying the inclination of the cylinder.

Upon the axle —1— I secure a bevel gear —15—, engaging with a like gear —16—, upon the forward end of the sulky, whereby the cylinder —C— is rotated.

The cylinder —C— is provided with perforations or slot-ways in its periphery for the purpose of allowing the earth to drop through after having been separated from the potatoes. It will thus be observed that when the sulky moves forward, the bevel gears —15— and —16—, will rotate the cylinder —C— and that as the potatoes and earth are forced into the scoop —B— they will slide over it into the cylinder, whereby the rotation thereof, the earth and potatoes will readily separate and the potatoes may be distributed at the rear of the machine, broad-cast, upon the ground, or suitable appliances may be provided for receiving them direct.

Having described my invention, what I claim is—

In a machine of the class described, the combination with the main frame mounted on wheels and extending rearwardly from the axle, of an intermediate frame pivoted on the axle and provided with a circular track-way and an adjusting lever, a separator revolubly mounted on the track-way and having a gear 16, the intermeshing pinion 15, the duplicate forwardly extending side bars pivoted to the frame in the rear of the axle, the shovels secured between the ends of said bars and entering the separator, the vertical rack bar secured at the ends of the bar 6, and the quadrant gear rotated by the ratchet lever, substantially as and for the purpose specified.

In witness whereof I have hereunto set my hand this 29th day of January, 1892.

WILLARD F. McNAMIRE.

In presence of—
F. L. NEWTON,
FRANK S. GULICK.